(12) United States Patent
Haserodt et al.

(10) Patent No.: US 11,706,343 B2
(45) Date of Patent: Jul. 18, 2023

(54) UNIFIED COMMUNICATIONS INCORPORATION IN A CONTACT CENTER

(71) Applicant: Avaya Management L.P., Durham, NC (US)

(72) Inventors: Kurt H. Haserodt, Westminster, CO (US); Joaquin Omar Alvarado, Eatontown, NJ (US); Christopher David Baldwin, Princeton, NJ (US)

(73) Assignee: Avaya Management L.P., Durham, NC (US)

( * ) Notice: Subject to any disclaimer, the term of this patent is extended or adjusted under 35 U.S.C. 154(b) by 0 days.

(21) Appl. No.: 17/515,852

(22) Filed: Nov. 1, 2021

(65) Prior Publication Data

US 2023/0140674 A1 May 4, 2023

(51) Int. Cl.
*H04M 3/00* (2006.01)
*H04M 3/523* (2006.01)
*H04M 3/51* (2006.01)

(52) U.S. Cl.
CPC ....... *H04M 3/5232* (2013.01); *H04M 3/5175* (2013.01); *H04M 3/5183* (2013.01); *H04M 3/5237* (2013.01)

(58) Field of Classification Search
CPC ............. H04M 3/5232; H04M 3/5175; H04M 3/5183; H04M 3/5237
USPC ....... 379/265.01–265.14, 266.01–266.1, 309
See application file for complete search history.

(56) References Cited

U.S. PATENT DOCUMENTS

| | | | | |
|---|---|---|---|---|
| 8,600,417 B1 * | 12/2013 | Mateer | ................... | H04W 4/14 455/418 |
| 11,082,558 B1 * | 8/2021 | Koster | ................ | H04M 3/5158 |
| 11,425,252 B1 * | 8/2022 | Martin | ................ | H04M 3/5233 |
| 2005/0177380 A1 * | 8/2005 | Pritchard | ........ | G06Q 10/063118 705/320 |
| 2005/0240671 A1 * | 10/2005 | Beyer | ................. | H04L 63/0815 709/227 |
| 2006/0062373 A1 * | 3/2006 | Chervets | ............. | H04M 3/5175 379/265.11 |
| 2008/0268825 A1 * | 10/2008 | Allen | ....................... | H04W 8/22 455/415 |
| 2011/0182283 A1 * | 7/2011 | Van Buren | .............. | H04W 4/14 704/270.1 |
| 2012/0278462 A1 * | 11/2012 | Lee | ....................... | G06F 15/173 709/223 |
| 2014/0112211 A1 * | 4/2014 | Walters | ................... | H04L 65/80 370/261 |

(Continued)

*Primary Examiner* — William J Deane, Jr.

(57) ABSTRACT

The technology disclosed herein enables incorporation of feature sets of a unified communications system and a contact center system. In a particular embodiment, a method includes, in a contact center system, in response to an agent logging into the contact center system, establishing a first connection between the contact center system and a unified communications endpoint operated by the agent. The first connection is established using a unified communications system that services the unified communications endpoint. After establishing the first connection, the method includes identifying a call on a second connection between the contact center system and a second endpoint operated by a user. In response to selecting the agent to handle the call, the method includes bridging the first connection and the second connection.

20 Claims, 7 Drawing Sheets

(56) References Cited

U.S. PATENT DOCUMENTS

| | | | | |
|---|---|---|---|---|
| 2015/0249743 A1* | 9/2015 | Sorokin | ............. | H04M 3/4365 |
| | | | | 379/201.01 |
| 2016/0301719 A1* | 10/2016 | Barjonas | ................ | H04L 63/08 |
| 2019/0141540 A1* | 5/2019 | Thubert | ............... | G05D 1/0274 |
| 2019/0158309 A1* | 5/2019 | Park | ................... | H04L 12/2832 |
| 2019/0158353 A1* | 5/2019 | Johnson | ............. | H04L 41/0803 |
| 2021/0005206 A1* | 1/2021 | Adi | ......................... | G06N 5/02 |

\* cited by examiner

UNIFIED COMMUNICATIONS INCORPORATION IN A CONTACT CENTER

TECHNICAL BACKGROUND

Contact center systems are typically capable of handling large numbers of calls with the contact center. Likewise, a contact center system can be scaled to distribute calls among tens of thousands, if not hundreds of thousands, of agents staffing the contact center. Unified communications systems provide many features, such as instant messaging/chat, presence status, noise suppression, call transcription, etc., that a contact center system does not. However, a unified communication system may lack the capability to handling the call volume and number of agents supported by a contact center system to handle calls with a contact center. Thus, agents of the contact center will not be able to benefit from unified communications features when participating in calls with the contact center.

SUMMARY

The technology disclosed herein enables incorporation of feature sets of a unified communications system and a contact center system. In a particular embodiment, a method includes, in a contact center system, in response to an agent logging into the contact center system, establishing a first connection between the contact center system and a unified communications endpoint operated by the agent. The first connection is established using a unified communications system that services the unified communications endpoint. After establishing the first connection, the method includes identifying a call on a second connection between the contact center system and a second endpoint operated by a user. In response to selecting the agent to handle the call, the method includes bridging the first connection and the second connection.

In some examples, after the call has ended, the method stops bridging the first connection and the second connection while the first connection remains connected between the unified communications endpoint and the contact center system.

In some examples, after the call has ended, the method includes identifying a second call on a third connection between the contact center system and a third endpoint operated by another user and, in response to selecting the agent to handle the second call, bridging the first connection and the third connection.

In some examples, the method includes disconnecting the first connection in response to the agent logging out of the contact center system.

In some examples, the method includes verifying the agent over the first connection.

In some examples, the method includes, before bridging the first connection and the second connection, transmitting audio over the first connection to the unified communications endpoint. The audio, when presented by the unified communications endpoint, provides information about the call to the agent.

In some examples, the method includes receiving an event notification from the unified communications endpoint over the first connection. The event notification indicates a unified communications event that occurred at the unified communications endpoint.

In some examples, the method includes transmitting a control message to the unified communications endpoint over the first connection. The control message directs the unified communications endpoint to perform a unified communications operation.

In some examples, the method includes receiving media transmitted over the first connection from the unified communications endpoint even when the first connection is not bridged to another connection. The media is used for agent monitoring, agent management, and inter-call operations.

In some examples, the method includes, in response to determining that the first connection has disconnected, reestablishing the first connection and bridging the second connection to the reestablished first connection.

In another embodiment, an apparatus for a contact center system is provided having one or more computer readable storage media and a processing system operatively coupled with the one or more computer readable storage media. Program instructions stored on the one or more computer readable storage media, when read and executed by the processing system, direct the processing system to, in response to an agent logging into the contact center system, establish a first connection between the contact center system and a unified communications endpoint operated by the agent. The first connection is established using a unified communications system that services the unified communications endpoint. The program instructions further direct the processing system to, after establishing the first connection, identify a call on a second connection between the contact center system and a second endpoint operated by a user. The program instructions also direct the processing system to, in response to selecting the agent to handle the call, bridge the first connection and the second connection.

DETAILED DESCRIPTION

The contact center systems described herein connect to agent endpoints through unified communications systems so that agents can take advantage of the features provided by the unified communications systems. In particular, a contact center system establishes a unified communications connection to a unified communications endpoint operated by an agent. By virtue of the connection being a unified communications connection, the connection is established through a unified communications system with the contact center system and the agent endpoint being endpoints to that connection. The unified communications system can then provide unified communications features for the connection. A call on another connection between the contact center and another endpoint is bridged to the unified communications endpoint, which allows a user of the other endpoint and the agent to communicate with each other in real time over the bridged connections. Since the agent is communicating over a unified communications endpoint and connection, the agent is able to use all features available to them even though the unified communications connection does not extend all the way to the other user's endpoint.

Figure 1:
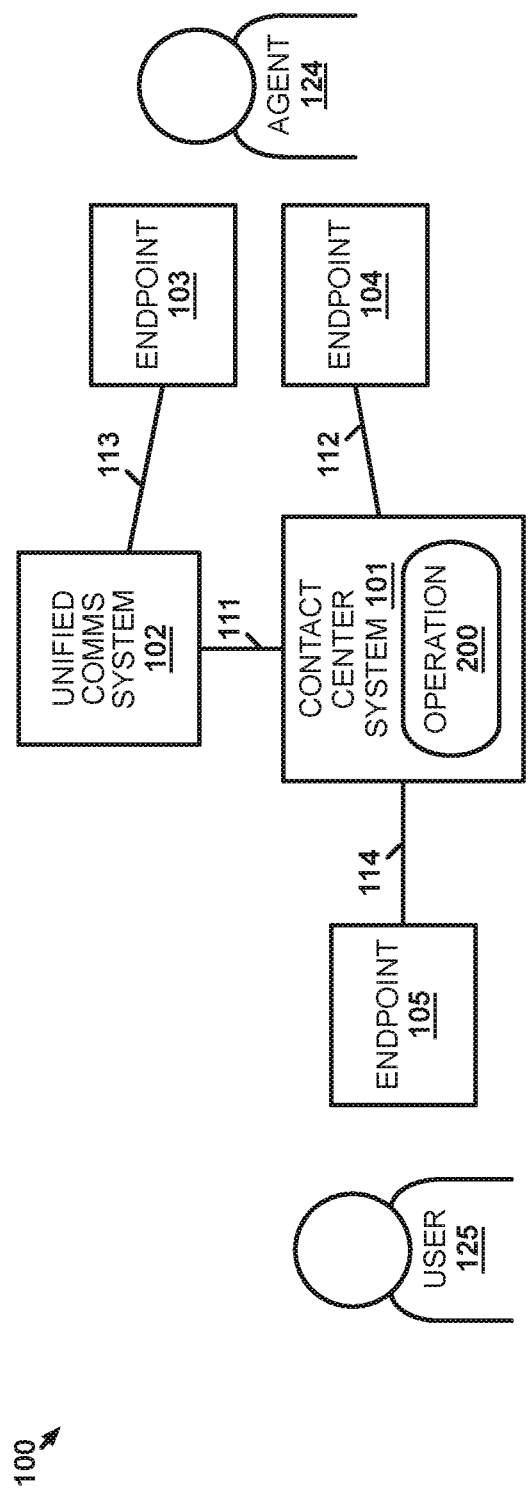
FIG. 1 illustrates an implementation for incorporating feature sets of a unified communications system and a contact center system.

FIG. 1 illustrates implementation 100 for incorporating feature sets of a unified communications system and a contact center system. Implementation 100 includes contact center system 101, unified communications system 102, endpoint 103, endpoint 104, and endpoint 105. The various elements in implementation 100 communicate with one another over respective communication links 111-114, as shown. Communication links 111-114 are shown as direct links but may include intervening systems, networks, and/or devices.

In operation, endpoint 103 and endpoint 104 are both operated by a single user, agent 124. Endpoint 105 is operated by user 125. Endpoints 103-105 may each respectively be a telephone, tablet computer, laptop computer, desktop computer, conference room system, or some other type of user operable computing system—including combinations thereof. While shown as distinct elements, endpoint 103 and endpoint 104 may be implemented on the same physical computing system. For example, endpoint 103 and endpoint 104 may be implemented using respective softclients on a desktop workstation of agent 124. Contact center system 101, unified communications system 102, endpoint 103, and endpoint 104 are all associated with a contact center staffed by agents, including agent 124 (e.g., the elements may be owned, leased, or otherwise maintained on behalf of the contact center). Elements 101-104 may all be located at a single premises, such as a building for the contact center, or may be distributed between multiple locations. User 125 is not associated with the contact center and represents a caller to/from the contact center, such as a customer or potential customer of a business represented by agents of the contact center.

In implementation 100, endpoint 104 is a contact center endpoint that communicates with contact center system 101 to avail itself to the features thereof (e.g., Computer Telephony Integration (CTI) that connects the telephony functions of contact center system 101 with business applications that may be used by agent 124) and enables agent 124 to exchange real-time user communications with other endpoints (e.g., have a voice conversation with a caller to the contact center). Contact center system 101 may further handle agent selection for calls with the contact center, queueing of calls, or some other call handling function between endpoints external to the contact center (e.g., endpoint 105) and contact center endpoints internal to the contact center (e.g., endpoint 104). Endpoint 103 is a unified communications endpoint that communicates with unified communications system 102 to avail itself to features thereof (e.g., voice/video calling, voicemail, text chat, call noise reduction, group calling, screen sharing, etc.). Unified communications system 102 may only enable communications with other unified communications endpoints or may enable calling to other endpoint, such as regular telephones (e.g., agent 124 may be able to place a personal call to family member's telephone). In a typical contact center, contact center system 101 and unified communications system 102 operate independently. Agent 124 would, therefore, operate endpoint 104 to access features of contact center system 101 (e.g., to handle calls with the contact center) and operate endpoint 103 to communicate using unified communications system 102 (e.g., to collaborate with other agents). Features of unified communications system 102 would not be available to contact center system 101 nor to contact center endpoints like endpoint 104. Operation 200 is performed by contact center system 101 to enable access to the features of unified communications system 102.

Figure 2:
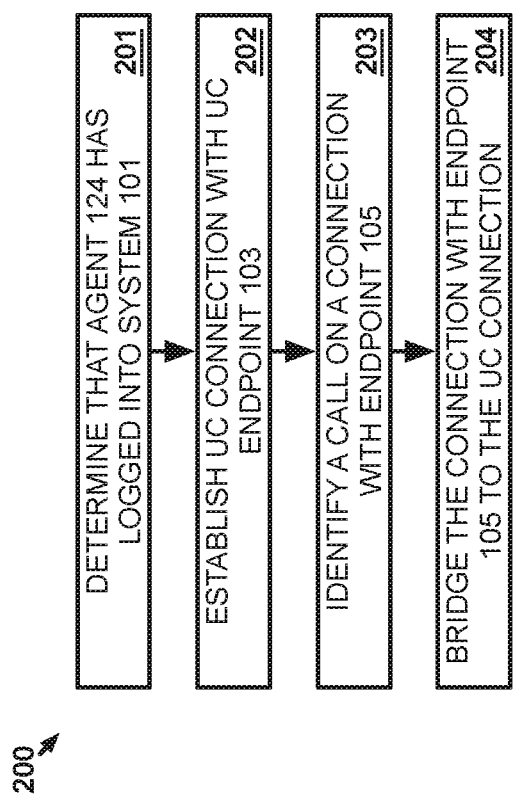
FIG. 2 illustrates an operation to incorporate feature sets of a unified communications system and a contact center system.

FIG. 2 illustrates operation 200 to incorporate feature sets of a unified communications system and a contact center system. In operation 200, contact center system 101 determines that agent 124 has logged into contact center system 101 via endpoint 104 (201). Logging into contact center system 101 indicates to contact center system 101 that agent 124 is present at endpoint 104. In some examples, logging in may indicate that agent 124 is ready to handle calls with the contact center while other examples may require explicit indication of such from agent 124 (e.g., agent 124 may have some administrative work to handle before they are ready to handle calls). Agent 124 may provide a username and password, scan their badge, provide biometric information (e.g., for fingerprint or facial recognition), or provide some other type of information to authenticate themselves to contact center system 101. In some examples, endpoint 104 may perform the authentication on behalf of contact center system 101 to log in agent 124.

In response to agent 124 logging in to contact center system 101, contact center system 101 establishes a unified communications connection between contact center system 101 and endpoint 103 using unified communications system 102 (202). Contact center system 101 may establish the unified communications connection by communicating with unified communications system 102 to initiate a connection request to endpoint 103. Contact center system 101 may execute unified communications client software, or is otherwise able to conform to the protocols and conventions required by unified communications system 102, that enables contact center system 101 to become a unified communications endpoint and take advantage of the features provided by unified communications system 102 just like other unified communications endpoints, such as endpoint 103. The communication connection preferably supports any type of communication mode for user communications handled by contact center system 101 assuming the communication modes are also supported by endpoint 103. For instance, if contact center system 101 supports video calls, then the unified communications connection with endpoint 103 will also support video calls. Contact center system 101 may maintain a list of contact information for contact center agents' unified communications endpoints so that a unified communications connection can be established with the proper unified communications endpoint of an agent logged into contact center system 101.

In some examples, contact center system 101 may verify that agent 124 is actually present over the unified communications connection. For instance, contact center system 101 may transmit audio media over the connection that requests a voice sample from agent 124 over the connection that is compared to a voice signature of agent 124 to ensure the user at endpoint 103 is agent 124. Similarly, agent 124 may be asked to speak a passphrase. In another example, the unified communications connection may carry video media and contact center system 101 may receive video captured by endpoint 103 of agent 124 to perform facial recognition on agent 124 to verify their identity. In a further example, the unified communications connection may include a chat channel over which agent 124 can input identifying information for reference by contact center system 101 to verify agent 124. Other manners of verifying a user's identity over a unified communications communication channel may also be used.

After establishing the unified communications connection, contact center system 101 identifies a call on another connection between contact center system 101 and endpoint 105 (203). The connection between contact center system 101 and endpoint 105 may have been established in response to endpoint 105 initiating an incoming call to contact center system 101, contact center system 101 initiating a call to endpoint 105, or may be imitated in some other manner. The call may be a voice call, such as a regular telephone call, or may include a video component as well (e.g., using Web Real-Time Communication), enabling user 125 and agent 124 to speak with one another in real time. The call may be identified as being a next call for handling by agent 124. The call may simply be the next call received by contact center system 101 and agent 124 may be the next agent in line to handle a call. The call may be directed to agent 124 specifically. Contact center system 101 may identify the call by determining that agent 124 should handle the call based on characteristics of the call and/or agent 124 (e.g., a topic for the call or reason that user 125 is calling and agent 124's expertise or department). The call may be identified out of a queue or may be identified immediately upon the connection being established. Other manners of identifying a call for connection to agent 124 may also be used.

In response to selecting agent 124 to handle the call, contact center system 101 bridges the unified communications connection with endpoint 103 and the call connection with endpoint 105 (204). Bridging the two connections enables user communications to be passed between the two connections. For example, a voice signal captured by endpoint 103 from agent 124 is transmitted over the unified communications connection through unified communications system 102 to contact center system 101. Contact center system 101 then passes the voice signal to the call connection over which the voice signal is transmitted to endpoint 105 for presentation to user 125. In some examples, contact center system 101 may reformat (e.g., transcode) media of the user communications (e.g., audio and/or video) to conform to the protocols/capabilities of each connection. For example, voice signals over the call connection may be in a different format than voice signals over the unified communications connection. Contact center system 101 may, therefore, reformat the voice signal from endpoint 105 for transmission over the unified communications channel to endpoint 103, and vice versa. Once bridged, agent 124 can use both features of contact center system 101 for the call and features of the unified communications connection via respective endpoints, endpoint 103 and endpoint 104.

An advantage of bridging to separate connections, as described above, is that when either one of the connections end, or are disconnected, the other can remain. As such, even when the call with user 125 has completed, contact center system 101 may stop bridging the connections (as may occur automatically when the call connection with endpoint 105 ends) and the unified communications connection with endpoint 103 may remain established. A subsequent call over a connection with contact center system 101 may then be identified by contact center system 101 and bridged by contact center system 101 to the unified communications connection with endpoint 103. As such, agent 124 may participate in calls with contact center system 101 over the same unified communications connection. Should the unified communications connection ever get disconnected, contact center system 101 may automatically attempt to reestablish the unified communications connection with endpoint 103. In those examples, if a call connection, such as the one from endpoint 105, was being bridged to the unified communications connection at the time of disconnect, contact center system 101 may automatically bridge that call connection back to the reestablished unified communications connection. During the time in which contact center system 101 is attempting to reestablish the unified communications connection, contact center system 101 may play an audio message to user 125, or otherwise inform user 125 about disconnect, over the call connection with endpoint 105.

At some point, agent 124 will likely log out of contact center system 101 (e.g., their shift may end or they may go on break). For instance, endpoint 104 may present agent 124 with a button to indicate their desire to log out of contact center system 101, although other manners for agent 124 to express their desire to log out may be used. When agent 124 logs out from contact center system 101, contact center system 101 may automatically disconnect the unified communications connection with endpoint 103 because agent 124 will no longer be handling calls with contact center system 101. In some examples, agent 124 may be able to indicate their desire to logout of contact center system 101 over the unified communications connection. For instance, agent 124 may be able to type a logout phrase into a chat channel of the unified communications connection, may speak a voice phrase over the unified communications connection, may intentionally end the unified communications connection, or may otherwise indicate their desire to log out.

Since the unified communications connection with endpoint 103 remains established while agent 124 is logged into contact center system 101, media can be exchanged over the connection even when no call is bridged to the unified communications connection. The media may be user communications captured by endpoint 103 from agent 124 and/or communications transmitted by contact center system 101 to agent 124. The media may be used for agent monitoring (e.g., to ensure agent 124 stays on task or determine their current sentiment/mood), agent management (e.g., to adjust a skill level of the agent based on what is heard), inter-call operations (e.g., direct contact center system 101 to answer a call, deflect a call, go on break, logout), or for some other purpose. For example, contact center system 101 may listen in to determine whether audio transmitted over the unified communications connection is consistent with an agent performing their duties. In another example, contact center system 101 may provide information over the unified communications connection (e.g., may provide audio messages to agent 124 about a soon to be connected call, about the contact center in general, or some other type of information).

In some examples, contact center system 101 may exchange unified communications messages in a protocol used by unified communications system 102. For instance, contact center system 101 may use Session Initiation Protocol (SIP) and contact center system 101 may exchange in-dialog SIP messages with unified communications system 102 and/or endpoint 103 in association with the unified communications connection. The messages may include messages to notify contact center system 101 about unified communications events that occur at endpoint 103, such as hold, un-hold, ring, answer, drop, and dial. The event notification may only be related to events on the unified communications connection with contact center system 101 or may include events related to other unified communications connections with endpoint 103 (e.g., to keep contact center system 101 apprised of other communications occurring at endpoint 103). For example, a SIP message from endpoint 103 may indicate that endpoint 103 has put the unified communications connection portion of the call on hold. That message may trigger contact center system 101 to perform play music over the call connection with endpoint 105 or otherwise indicate to user 125 that they have been placed on hold. The messages may also be used to control the unified communications features that endpoint 103 can access. For instance, contact center system 101 may transmit a control message that controls the unified communications features of endpoint 103 on the unified communications connection. For instance, the message may direct endpoint 103 to play an agent greeting, un-hold the communications over the unified communications connection, go into restricted mode to allow use specifically for contact center operations only (e.g., no personal calls), change the display (e.g., to display certain information, hide features, etc.), or to perform some other unified communications function. Depending on the feature being controlled, contact center system 101 may send the control message(s) to unified communications system 102 and/or endpoint 103. As such, the feature may be limited at unified communications system 102, at endpoint 103, or by some cooperation of the two.

Figure 3:
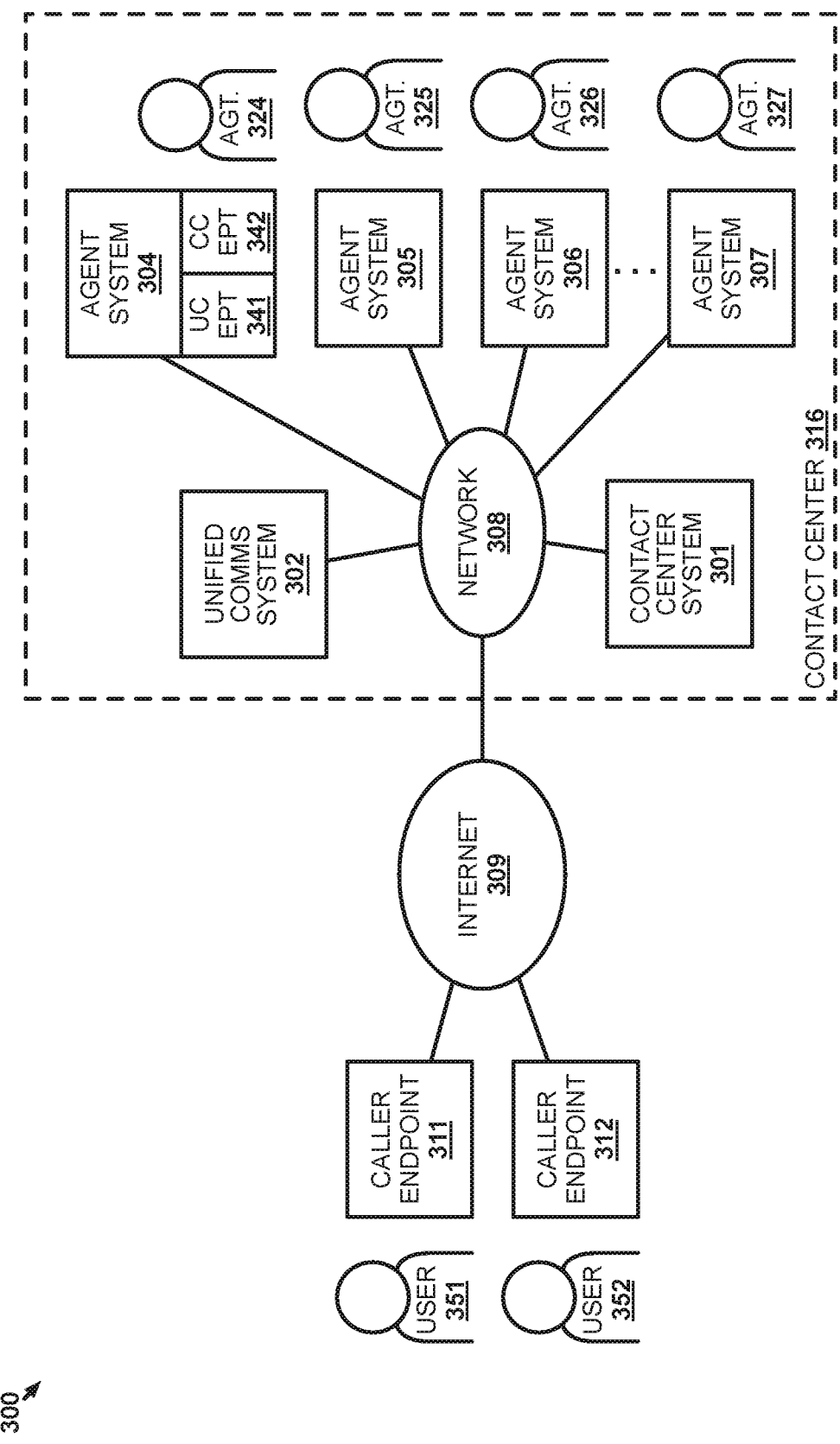
FIG. 3 illustrates an implementation for incorporating feature sets of a unified communications system and a contact center system.

FIG. 3 illustrates implementation 300 for incorporating feature sets of a unified communications system and a contact center system. Implementation 300 includes contact center system 301, unified communications system 302, agent systems 304-307, contact center network 308, caller endpoints 311-312, and Internet 309. Although, contact center system 301, unified communications system 302, agent systems 304-307, and contact center network 308 are part of contact center 316, no element of contact center 316 need be co-located with another. As such, contact center network 308 may use Internet 309, and possibly other local area networks, to exchange communications. While only four agent systems are shown in implementation 300, contact center 316 may include any number of agent endpoints.

In this example, agent systems 304-307 (e.g., desktop workstations) are operated by respective agents 324-327 as agents of contact center 316 and caller endpoints 311-312 are operated by users 351-352 who are callers to contact center 316. Though all of caller endpoints 311-312 connect over Internet 309, it should be understood that calls to contact center 316 may be traditional telephone calls, which may be transported over Internet 309. Contact center system 301 receives call directed to contact center 316, determines to which of agents 324-327 the calls should be directed, and directs the call to the selected agents' systems 304-307 accordingly. Unified communications system 302 provides unified communications features to agent systems 304-307. In this example, each agent system executes a soft client for communicating with and accessing features of contact center system 301 and executes another soft client for communicating with and accessing features of unified communications system 302. Agent system 304 in particular is shown to execute unified communications endpoint 341 and contact center endpoint 342, although, it should be understood that agent systems 305-307 execute similar soft clients that perform similarly to that described for endpoints 341-342 below. In other examples, endpoints 341-342 may be implemented on separate systems, including dedicated endpoint hardware (e.g., a telephone device), rather than being implemented as soft clients.

Figure 4:
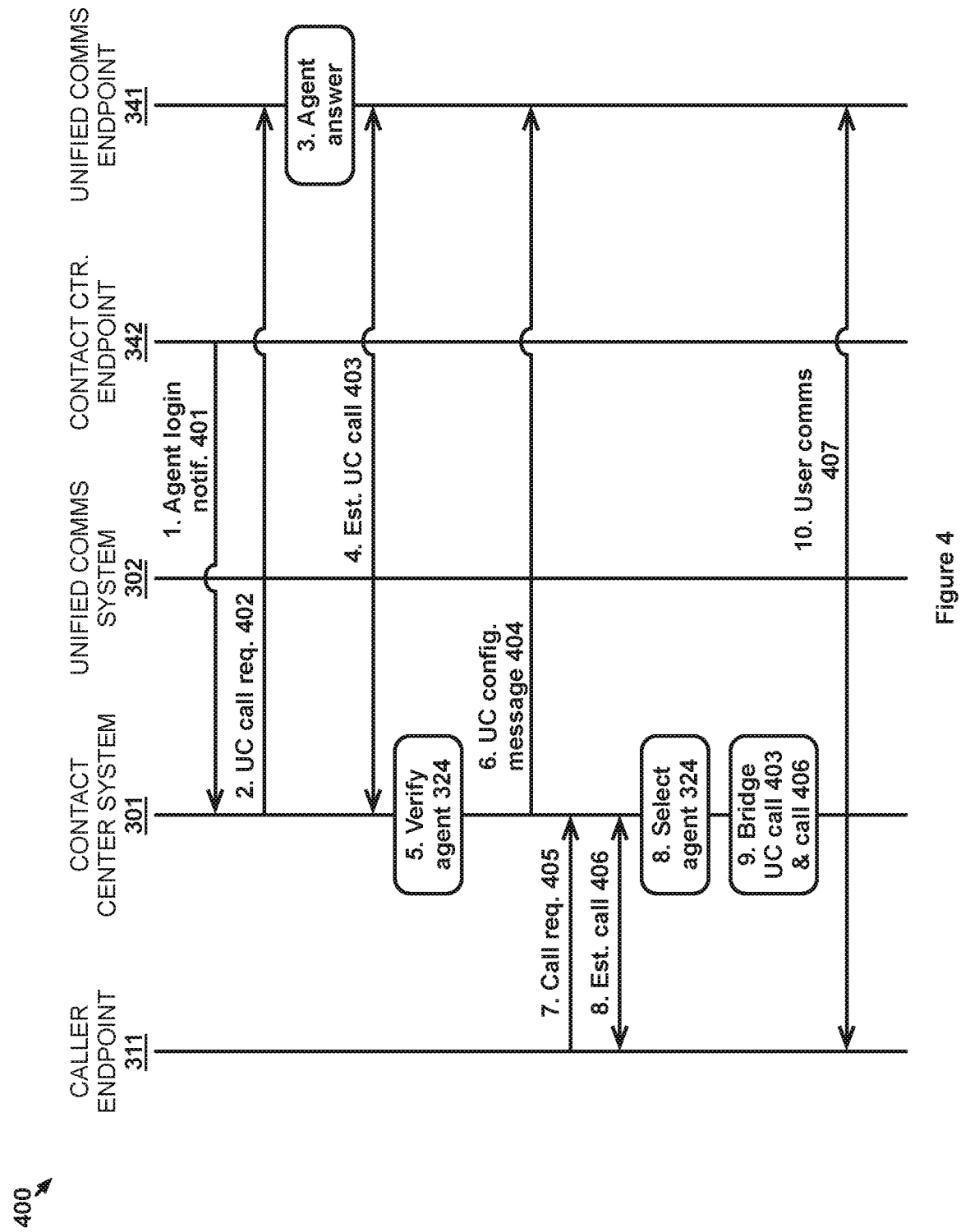
FIG. 4 illustrates an operational scenario for incorporating feature sets of a unified communications system and a contact center system.

FIG. 4 illustrates operational scenario 400 for incorporating feature sets of a unified communications system and a contact center system. In operational scenario 400, agent 324 arrives at contact center 316 and logs into contact center endpoint 342 (e.g., agent 324 may provide user credentials to contact center endpoint 342). Contact center endpoint 342 then transfers agent login notification 401 to contact center system 301 at step 1 to notify contact center system 301 that agent 324 has logged in so that contact center system 301 can log agent 324 into contact center system 301 accordingly. While not shown, if agent 324 is not already logged unified communications endpoint 341 into unified communications system 302, agent 324 also logs into unified communications system 302 via unified communications endpoint 341 so that unified communications endpoint 341 can receive a unified communications call from contact center system 301.

In response to agent 324 logging into contact center system 301, contact center system 301 identifies unified communications contact information for unified communications endpoint 341 associated with agent 324 and transmits unified communications call request 402 at step 2. Unified communications call request 402 is a request to open a unified communications connection in a protocol (e.g., SIP) supported by unified communications system 302. Like any incoming unified communications call request, unified communications endpoint 341 notifies agent 324 of unified communications call request 402. Agent 324 answers unified communications call request 402 at step 3 (e.g., selects an answer button displayed by unified communications endpoint 341 on agent system 304, presses an answer button a communications headset, or otherwise indicated that they want to answer unified communications call request 402). In some examples, unified communications endpoint 341 may be configured to automatically answer unified communications call request from contact center system 301. In response to agent 324 answering unified communications call request 402, unified communications system 302 establishes a connection for unified communications call 403 at step 4 between unified communications endpoint 341 and contact center system 301.

Once unified communications call 403 has been established, user communication media can be exchanged over unified communications call 403. Even though no human is at contact center system 301 to exchange the user communications with agent 324, contact center system 301 uses unified communications call 403 to verify agent 324 at step 5. For example, contact center system 301 may play a greeting message over unified communications call 403 and request that agent 324 speak identifying information over unified communications call 403 (e.g., may request that agent 324 speak their passphrase, which will have been defined in contact center system 301 previously). Other manners of verifying agent 324's identity over unified communications call 403 may instead be used. Before connecting agent 324 to a caller, contact center system 301 transmits an in-dialog SIP message 404 to unified communications endpoint 341 at step 6. In this example, SIP message 404 directs unified communications endpoint 341 to not connect to other unified communications calls and directs unified communications endpoint 341 to not display notifications of incoming calls so as not to distract agent 324.

After unified communications endpoint 341 has been configured as instructed by SIP message 404, contact center system 301 may now direct incoming calls to unified communications endpoint 341 should agent 324 be selected. Contact center system 301 receives call request 405 from caller endpoint 311 at step 7 and establishes call 406 responsively at step 8. Before connecting call 406 to an agent, contact center system 101 (or another system, such as an interactive voice response system) may query user 351 about their reason for calling. For example, user 351 may be a customer calling for tech support about a specific product. Contact center system 301 selects agent 324 as being the appropriate agent to handle call 406 at step 8 (e.g., agent 324 may have the proper expertise to address user 351's tech support issue). Since unified communications call 403 has already been established with unified communications endpoint 341 of agent 324, contact center system 301 simply bridges call 406 and unified communications call 403 to each other at step 9 to connect caller endpoint 311 and unified communications endpoint 341. In some example, contact center system 301 may first transmit audio (e.g., a tone or voice message) to unified communications endpoint 341 over unified communications call 403 to notify agent 324 that a call is incoming. Once unified communications call 403 and call 406 are bridged, agent 324 and user 351 can speak with each other via user communications 407 exchanged between caller endpoint 311 and unified communications endpoint 341 over unified communications call 403 and call 406.

Figure 5:
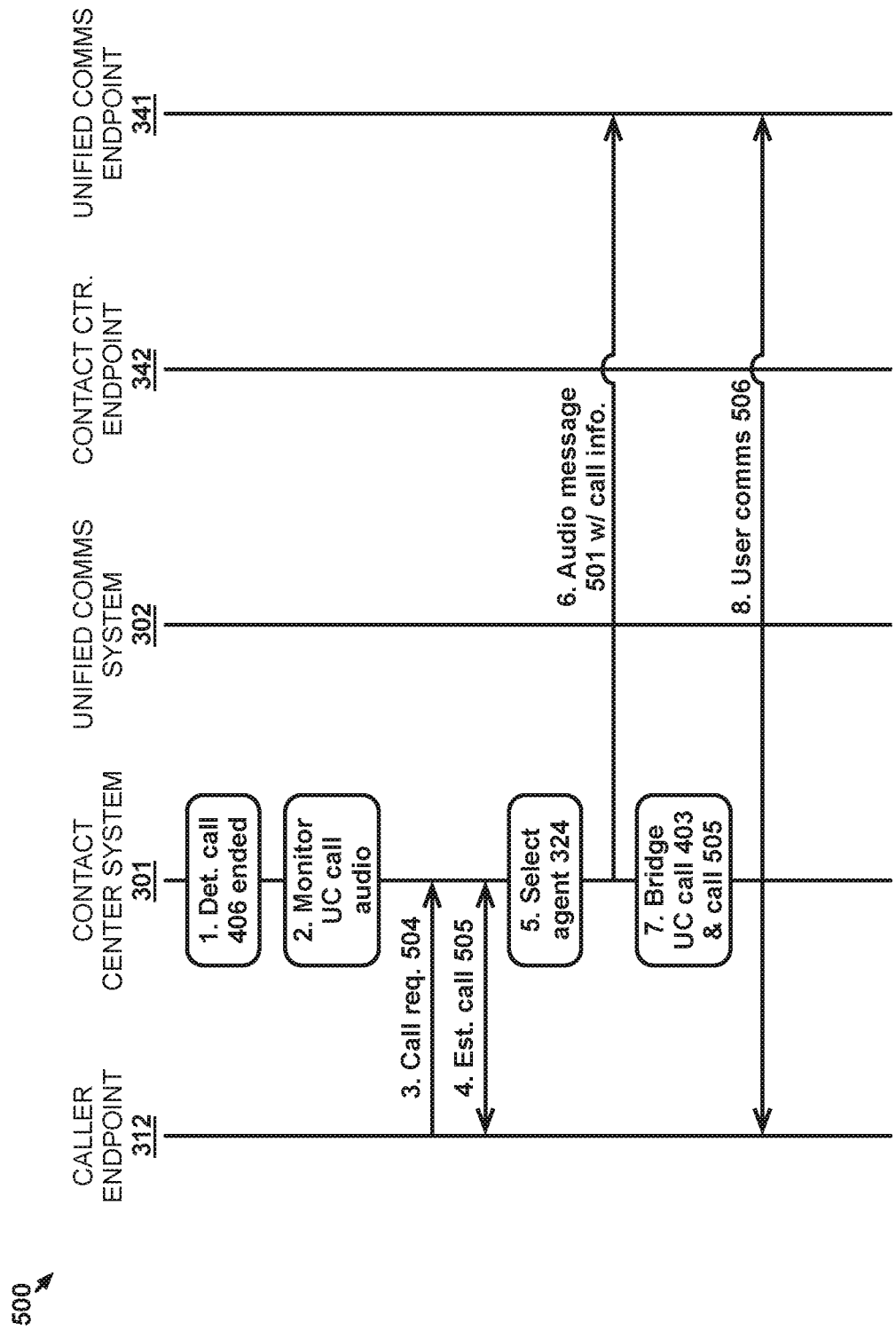
FIG. 5 illustrates an operational scenario for incorporating feature sets of a unified communications system and a contact center system.

FIG. 5 illustrates operational scenario 500 for incorporating feature sets of a unified communications system and a contact center system. Operational scenario 500 occurs after operational scenario 400. In operational scenario 500, contact center system 301 determines at step 1 that call 406 has ended. For example, user 351 may hang up at caller endpoint 311 and close the connection for call 406, agent 324 may instruct via unified communications endpoint 341 for call 406 (not unified communications call 403) to be ended by contact center system 301, agent 324 may instruct through contact center endpoint 342 for call 406 to be ended by contact center system 301, or contact center system 301 may recognize that call 406 has ended in some other manner. In this scenario, contact center system 301 continues to monitor call audio received over unified communications call 403 at step 2 even though unified communications call 403 is not bridged to a call with a caller. Contact center system 301 monitors the audio to improve the operation of contact center 316. The audio may indicate what agent 324 is doing when not on a call (e.g., that they stay focused, that they are distracted with personal issues, that they play games, etc.), which may help contact center 316 with determining whether agent 324 requires additional training, intervention from a supervisor, or some other action. The audio may indicate a sentiment and/or mood of agent 324, which may be used to determine whether agent 324 is in a state of mind to properly handle additional calls (e.g., contact center system 301 may wait for agent 324's mood to change before routing another call to them).

Contact center system 301 receives call request 504 from caller endpoint 312 at step 3 and establishes call 505 withe caller endpoint 312 at step 4 in a similar manner to steps 7 and 8 of operational scenario 400. In some examples, steps 3 and 4 may occur prior to call 406 ending and call 505 may be placed in a queue for an agent to come available (e.g., to wait for call 406 to end and agent 324 to be available, assuming call 505 is next in the queue). Agent 324 is selected for call 505 at step 5 in a manner similar to how contact center system 301 selected agent 324 for call 406 (e.g., agent 324 may have the expertise to handle the issue about which user 352 is calling).

In this example, before contact center system 301 bridges call 505 to unified communications call 403, contact center system 301 transmits real-time audio message 501 to agent 324 as user communication media over unified communications call 403 at step 6. Audio message 501, when played by unified communications endpoint 341, provides information to agent 324 about call 505. The call information may include user 352's name, a topic about which they are calling, helpful hints based on user 352's history with contact center 316 (e.g., tactics that user 352 has responded well to), or any other information that may be useful to agent 324 when handling call 505. Since unified communications system 302 provides unified communications service to contact center system 301 and unified communications endpoint 341, a text chat channel may also be available for communicating between contact center system 301 and unified communications endpoint 341. Call information may also, or instead, be provided to agent 324 over that channel even once call 505 has been bridged (e.g., to not interrupt a conversation between agent 324 and user 352.

After audio message 501 has been completed, contact center system 301 bridges unified communications call 403 to call 505 at step 7. Unified communications endpoint 341 and caller endpoint 312 then exchange user communications 506 over the bridged connections. Like user communications 407, user communications 506 at least include media of user 352 and agent 324's voices so that they can have a real-time voice conversation. Even though call 505 is a new call with contact center system 301, since unified communications call 403 remained connected, the same unified communications call 403 is used to connect call 505 with unified communications endpoint 341 rather than contact center system 301 establishing a new unified communications connection.

Figure 6:
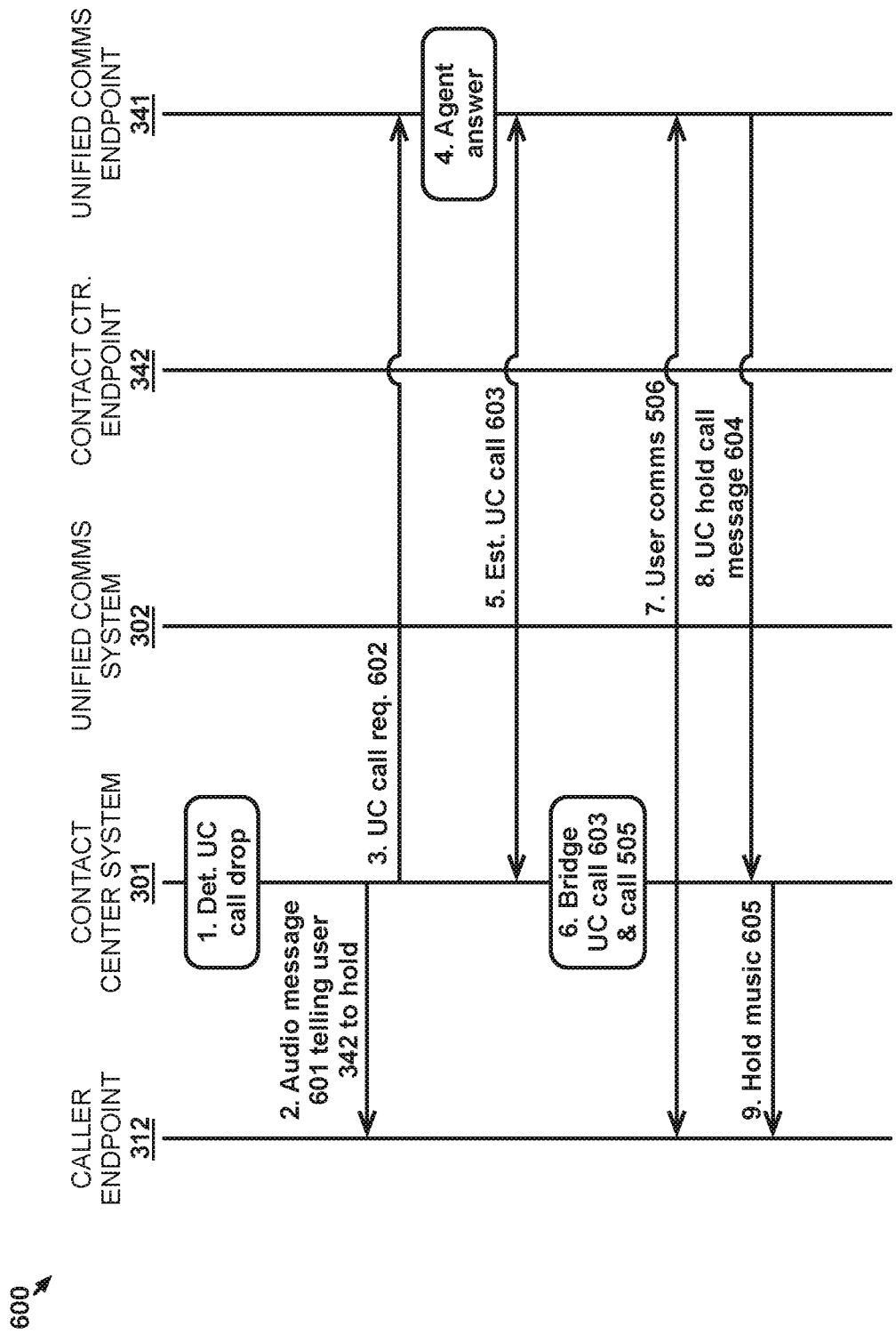
FIG. 6 illustrates an operational scenario for incorporating feature sets of a unified communications system and a contact center system.

FIG. 6 illustrates operational scenario 600 for incorporating feature sets of a unified communications system and a contact center system. Operational scenario 600 occurs after operational scenario 500. In operational scenario 600, contact center system 301 determines that unified communications call 403 has dropped at step 1. The dropping of unified communications call 403 may be caused by unified communications endpoint 341 having stopped executing on agent system 304 (e.g., agent 324 accidentally quits the application or the application crashes), an error on agent system 304 otherwise causes unified communications endpoint 341 to stop executing properly, software executing on contact center system 301 to support contact center system 301 operating as a unified communications endpoint may stop executing (e.g., crash), an issue may occur on the communication links between agent system 304 and unified communications system 302 or between contact center system 301 and unified communications system 302, an issue may occur in unified communications system 302, or some other issue may occur causing unified communications call 403 to disconnect.

In response to unified communications call 403 disconnecting, contact center system 301 transmits audio message 601 over call 505 at step 2 to tell caller 352 to hold. Audio message 601 may further inform caller 352 about the reason that they need to hold (i.e., that an issue occurred at contact center 316), may provide an estimated time for reconnect, or may provide other information that may be useful to user 352 while they wait. Also, in response to unified communications call 403 disconnecting, contact center system 301 automatically attempts to reconnect a unified communications connection to unified communications endpoint 341 by transmitting unified communications call request 602 to unified communications endpoint 341 through unified communications system 302. Unified communications endpoint 341 notifies agent 324 about unified communications call request 602 and agent 324 answers unified communications call request 602 at step 4. In some examples, unified communications endpoint 341 may automatically answer on behalf of agent 324. Upon unified communications call request 602 being answered, unified communications call 603 is established through unified communications system 302 between contact center system 301 and unified communications endpoint 341. Had agent 324 not answered unified communications call request 602, then contact center system 301 may continue trying to reach agent 324 by periodically sending new unified communications call requests (e.g., the issue that caused unified communications call 403 to drop may still be in the process of being solved). After a given amount of time, contact center system 301 may stop trying to reestablish a unified communications call and, instead, try routing hold music 605 directly to contact center endpoint 342, which would prevent unified communications features from being used, or may select a different agent to continue handling call 505.

In this case, since unified communications call 603 was established, contact center system 301 bridges call 505 at step 6 to the newly established unified communications call 603. User communications 506 then continue to be exchanged at step 7 over the newly bridged calls 505 and 603. In this example, agent 324 determines that they need to place user 352 on hold. Agent 324, therefore, selects a hold call option provided by unified communications endpoint 341 (e.g., a button in an interface displayed by unified communications endpoint 341). Unified communications endpoint 341 transfers hold call message 604 to unified communications system 302 at step 8 indicating that unified communications call 603 should be placed on hold and unified communications system 302 passes that information onto contact center system 301 to inform it that hold call message 604 has been placed on hold. If unified communications system 302 uses SIP, then hold call message 604 may be an in-dialog SIP message. Upon receiving hold call message 604, contact center system 301 plays hold music 605 at step 9 to user 352 over call 505. In some examples, hold music 605 may be triggered by contact center system 301 placing call 505 on hold to mirror the fact that unified communications call 603 is on hold. A second message may be transferred from unified communications endpoint 341 to indicate when agent 324 wishes to take the call off hold, which triggers contact center system 301 to stop hold music 605 and continue exchanging user communications 506.

Figure 7:
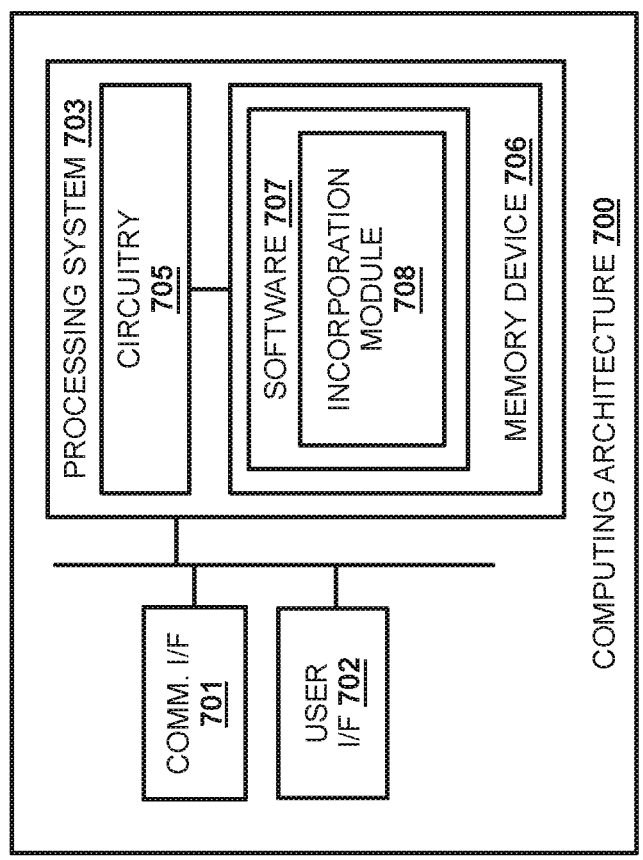
FIG. 7 illustrates a computing architecture for incorporating feature sets of a unified communications system and a contact center system.

FIG. 7 illustrates computing architecture 700 for incorporating feature sets of a unified communications system and a contact center system. Computing architecture 700 is an example computing architecture for contact center systems 101 and 301, although systems 101 and 301 may use alternative configurations. Computing architecture 700 may also be used for other computing systems described herein, such as the described unified communications systems and endpoints. Computing architecture 700 comprises communication interface 701, user interface 702, and processing system 703. Processing system 703 is linked to communication interface 701 and user interface 702. Processing system 703 includes processing circuitry 705 and memory device 706 that stores operating software 707.

Communication interface 701 comprises components that communicate over communication links, such as network cards, ports, RF transceivers, processing circuitry and software, or some other communication devices. Communication interface 701 may be configured to communicate over metallic, wireless, or optical links. Communication interface 701 may be configured to use TDM, IP, Ethernet, optical networking, wireless protocols, communication signaling, or some other communication format—including combinations thereof.

User interface 702 comprises components that interact with a user. User interface 702 may include a keyboard, display screen, mouse, touch pad, or some other user input/output apparatus. User interface 702 may be omitted in some examples.

Processing circuitry 705 comprises microprocessor and other circuitry that retrieves and executes operating software 707 from memory device 706. Memory device 706 comprises a computer readable storage medium, such as a disk drive, flash drive, data storage circuitry, or some other memory apparatus. In no examples would a computer readable storage medium of memory device 706, or any other computer readable storage medium herein, be considered a transitory form of signal transmission (often referred to as "signals per se"), such as a propagating electrical or electromagnetic signal or carrier wave. Operating software 707 comprises computer programs, firmware, or some other form of machine-readable processing instructions. Operating software 707 includes incorporation module 708. Operating software 707 may further include an operating system, utilities, drivers, network interfaces, applications, or some other type of software. When executed by processing circuitry 705, operating software 707 directs processing system 703 to operate computing architecture 700 as described herein.

In particular, incorporation module 708 directs processing system 703 to, in response to an agent logging into the contact center system, establish a first connection between the contact center system and a unified communications endpoint operated by the agent. The first connection is established using a unified communications system that services the unified communications endpoint. After establishing the first connection, incorporation module 708 directs processing system 703 to identify a call on a second connection between the contact center system and a second endpoint operated by a user. In response to selecting the agent to handle the call, incorporation module 708 directs processing system 703 to bridge the first connection and the second connection.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:
1. A method comprising:
in a contact center system:
in response to an agent logging into the contact center system, establishing a first connection between the contact center system and a unified communications endpoint operated by the agent, wherein the first connection is established using a unified communications system that services the unified communications endpoint;

after establishing the first connection, identifying a call on a second connection between the contact center system and a second endpoint operated by a user; and in response to selecting the agent to handle the call, bridging the first connection and the second connection.

2. The method of claim 1, comprising:

after the call has ended, stopping bridging the first connection and the second connection while the first connection remains connected between the unified communications endpoint and the contact center system.

3. The method of claim 1, comprising:

after the call has ended, identifying a second call on a third connection between the contact center system and a third endpoint operated by another user; and in response to selecting the agent to handle the second call, bridging the first connection and the third connection.

4. The method of claim 1, comprising:

disconnecting the first connection in response to the agent logging out of the contact center system.

5. The method of claim 1, comprising:

verifying an identity of the agent over the first connection.

6. The method of claim 1, comprising:

before bridging the first connection and the second connection, transmitting audio over the first connection to the unified communications endpoint, wherein the audio, when presented by the unified communications endpoint, provides information about the call to the agent.

7. The method of claim 1, comprising:

receiving an event notification from the unified communications endpoint over the first connection, wherein the event notification indicates a unified communications event that occurred at the unified communications endpoint.

8. The method of claim 1, comprising:

transmitting a control message to the unified communications endpoint over the first connection, wherein the control message directs the unified communications endpoint to perform a unified communications operation.

9. The method of claim 1, comprising:

receiving media transmitted over the first connection from the unified communications endpoint even when the first connection is not bridged to another connection, wherein the media is used for agent monitoring, agent management, and inter-call operations.

10. The method of claim 1, comprising:

in response to determining that the first connection has disconnected, reestablishing the first connection and bridging the second connection to the reestablished first connection.

11. An apparatus for a contact center system, the apparatus comprising:

one or more computer readable storage media;

a processing system operatively coupled with the one or more computer readable storage media; and program instructions stored on the one or more computer readable storage media that, when read and executed by the processing system, direct the processing system to:

in response to an agent logging into the contact center system, establish a first connection between the contact center system and a unified communications endpoint operated by the agent, wherein the first connection is established using a unified communications system that services the unified communications endpoint;

after establishing the first connection, identify a call on a second connection between the contact center system and a second endpoint operated by a user; and in response to selecting the agent to handle the call, bridge the first connection and the second connection.

12. The apparatus of claim 11, wherein the program instructions direct the processing system to:

after the call has ended, stop bridging the first connection and the second connection while the first connection remains connected between the unified communications endpoint and the contact center system.

13. The apparatus of claim 11, wherein the program instructions direct the processing system to:

after the call has ended, identify a second call on a third connection between the contact center system and a third endpoint operated by another user; and in response to selecting the agent to handle the second call, bridge the first connection and the third connection.

14. The apparatus of claim 11, wherein the program instructions direct the processing system to:

disconnect the first connection in response to the agent logging out of the contact center system.

15. The apparatus of claim 11, wherein the program instructions direct the processing system to:

verify an identity of the agent over the first connection.

16. The apparatus of claim 11, wherein the program instructions direct the processing system to:

before bridging the first connection and the second connection, transmit audio over the first connection to the unified communications endpoint, wherein the audio, when presented by the unified communications endpoint, provides information about the call to the agent.

17. The apparatus of claim 11, wherein the program instructions direct the processing system to:

receive an event notification from the unified communications endpoint over the first connection, wherein the event notification indicates a unified communications event that occurred at the unified communications endpoint.

18. The apparatus of claim 11, wherein the program instructions direct the processing system to:

transmit a control message to the unified communications endpoint over the first connection, wherein the control message directs the unified communications endpoint to perform a unified communications operation.

19. The apparatus of claim 11, wherein the program instructions direct the processing system to:

receive media transmitted over the first connection from the unified communications endpoint even when the first connection is not bridged to another connection, wherein the media is used for agent monitoring, agent management, and inter-call operations.

20. One or more computer readable storage media having program instructions stored thereon that, when read and executed by a processing system of a contact center system, direct the contact center system to:

in response to an agent logging into the contact center system, establish a first connection between the contact center system and a unified communications endpoint operated by the agent, wherein the first connection is established using a unified communications system that services the unified communications endpoint;

after establishing the first connection, identify a call on a second connection between the contact center system and a second endpoint operated by a user; and in response to selecting the agent to handle the call, bridge the first connection and the second connection.

\* \* \* \* \*